United States Patent
Hori et al.

(10) Patent No.: US 8,845,848 B2
(45) Date of Patent: Sep. 30, 2014

(54) MAGNESIUM ALLOY MEMBER

(75) Inventors: Akihisa Hori, Isehara (JP); Hiroshi Kumagai, Yamato (JP); Yasuyuki Katsumata, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 377 days.

(21) Appl. No.: 13/295,498

(22) Filed: Nov. 14, 2011

(65) Prior Publication Data

US 2012/0055629 A1     Mar. 8, 2012

Related U.S. Application Data

(62) Division of application No. 12/828,712, filed on Jul. 1, 2010, now abandoned.

(30) Foreign Application Priority Data

Jul. 3, 2009    (JP) .................................. 2009-158431
Jul. 3, 2009    (JP) .................................. 2009-158432

(51) Int. Cl.
| | | |
|---|---|---|
| *B32B 37/00* | (2006.01) | |
| *C23F 1/00* | (2006.01) | |
| *C22C 23/00* | (2006.01) | |
| *C23C 22/68* | (2006.01) | |
| *C22C 23/02* | (2006.01) | |
| *C23C 22/57* | (2006.01) | |
| *C09J 5/02* | (2006.01) | |

(52) U.S. Cl.
CPC . *C23F 1/00* (2013.01); *C22C 23/00* (2013.01); *C23C 22/68* (2013.01); *C22C 23/02* (2013.01); *C23C 22/57* (2013.01); *C09J 5/02* (2013.01)
USPC .......................................... 156/319; 156/314

(58) Field of Classification Search
CPC .................................................. C09J 5/02
USPC ...................... 156/308.8, 314, 315, 319, 316; 148/243, 257, 263; 216/100, 102
See application file for complete search history.

(56) References Cited

U.S. PATENT DOCUMENTS

| | | |
|---|---|---|
| 3,784,417 A | 1/1974 | Brown |
| 3,852,125 A | 12/1974 | Brown |
| 4,182,382 A | 1/1980 | Ingraham |
| 4,430,234 A | 2/1984 | Hasegawa et al. |

(Continued)

FOREIGN PATENT DOCUMENTS

| | | |
|---|---|---|
| CN | 101240421 A | 8/2008 |
| JP | 50-148990 A | 11/1975 |

(Continued)

OTHER PUBLICATIONS

Machine translation of JP 10278502 date unknown.*

(Continued)

*Primary Examiner* — John Goff
(74) *Attorney, Agent, or Firm* — Foley & Lardner LLP

(57) ABSTRACT

There is provided a magnesium alloy member that includes an aluminum-containing magnesium alloy material. The magnesium alloy material has a modified layer formed at a surface thereof in such a manner that at least a surface of the modified layer has a higher aluminum content than that of any unmodified base portion of the magnesium alloy material.

7 Claims, 1 Drawing Sheet

(56) References Cited

U.S. PATENT DOCUMENTS

| | | | |
|---|---|---|---|
| 4,560,599 A | 12/1985 | Regen | |
| 5,342,456 A | 8/1994 | Dolan | |
| 6,168,868 B1 * | 1/2001 | Hauser et al. | 428/457 |
| 6,258,759 B1 | 7/2001 | Futahashi et al. | |
| 6,328,530 B1 | 12/2001 | Kato et al. | |
| 2006/0113007 A1 * | 6/2006 | Morris | 148/273 |
| 2006/0249393 A1 | 11/2006 | Ghosh et al. | |
| 2008/0206520 A1 | 8/2008 | Il et al. | |
| 2009/0253023 A1 | 10/2009 | Hayashi et al. | |
| 2010/0112287 A1 | 5/2010 | Naritomi et al. | |

FOREIGN PATENT DOCUMENTS

| | | | |
|---|---|---|---|
| JP | 54-88879 A | | 7/1979 |
| JP | 57-16794 A | | 1/1982 |
| JP | 58-8799 A | | 1/1983 |
| JP | 61-96073 A | | 5/1986 |
| JP | 5-195244 A | | 8/1993 |
| JP | 2008-214751 A | | 8/1996 |
| JP | 10278502 A | * | 10/1998 |
| JP | 11-264078 A | | 9/1999 |
| JP | 2001-152393 A | | 6/2001 |
| JP | 2002-275668 A | | 9/2002 |
| JP | 2003-3273 A | | 1/2003 |
| JP | 2003-27255 A | | 1/2003 |
| JP | 2003-147545 A | | 5/2003 |
| JP | 2003-193259 A | | 7/2003 |
| JP | 2003-277960 A | | 10/2003 |
| JP | 2005-36070 A | | 2/2005 |
| JP | 2005-343948 A | | 12/2005 |
| JP | 2009-114504 A | | 5/2009 |
| JP | 2009-120877 A | | 6/2009 |
| WO | WO 99/21944 A1 | | 5/1999 |
| WO | WO 2008/133096 A1 | | 11/2008 |

OTHER PUBLICATIONS

Shigematsu et al., "Surface treatment of AZ91D magnesium alloy by aluminum diffusion coating", *Journal of Materials Science Letters*, No. 19, (2000), pp. 473-475.

Chang et al., "Electrodeposition of aluminum on magnesium alloy in aluminum chloride ($AlCl_3$)—1—ethyl—methylimidazolium chloride (EMIC) ionic liquid and its corrosion behavior", *Electrochemistry Communications*, No. 9, (2007), pp. 1602-1606.

SAE International, J465, Surface Vehicle Standard—Magnesium Casting Alloys, Issued Jan. 1940, Reaffirmed Jan. 1989, 12 pages.

* cited by examiner

MAGNESIUM ALLOY MEMBER

CROSS REFERENCE TO RELATED APPLICATIONS

This application is a divisional of U.S. application Ser. No. 12/828,712, filed Jul. 1, 2010, now abandoned which claims benefit of priority from the prior Japanese Application No. 2009-158431, filed Jul. 3, 2009 and Japanese Application No. 2009-158432, filed Jul. 3, 2009; the entire contents of all of which are incorporated herein by reference.

BACKGROUND OF THE INVENTION

The present invention relates to a surface modification technique for a magnesium alloy material and, more particularly, to a magnesium alloy member consisting of or comprising a magnesium alloy material formed with a surface modified layer to achieve good adhesion (bonding/coating) properties.

In recent years, there are increasing applications of not only resin materials such as polyethylene resins and polypropylene resins but also light metal materials such as aluminum alloys and magnesium alloys for vehicle weight reductions. Various surface modification techniques, bonding techniques and coating techniques have been developed to produce composites of light metal materials or composites of light metal materials and other materials. One of the surface modification techniques is surface treatment of a metal material with a chromium-free acidic composition. For example, Patent Document 1 discloses a surface modification technique that forms a coating film on a metal material by surface treatment with an aqueous corrosion-resistant coating solution, and then, fixes the coating film to the metal surface by baking and drying without water washing.

Patent Document 1: Japanese Laid-Open Patent Publication No. 5-195244

SUMMARY OF THE INVENTION

The surface modification technique of Patent Document 1 does not involve a chemical reaction to form and fix the coating film and thus can be applied to various kinds of metal materials such as irons, steels, zinc alloys, aluminum alloys and magnesium alloys. It is however difficult to form and fix (bake, dry) the coating film onto complicate structural parts e.g. vehicle parts uniformly by the surface modification technique of Patent Document 1. In particular, there is a problem in the surface modification technique of Patent Document 1 that the coating film does not have high durability and good adhesion to magnesium alloys.

It is accordingly an object of the present invention to provide a magnesium alloy member consisting of or comprising a magnesium alloy material formed with an active surface modified layer to achieve good adhesion (bonding/coating) properties.

According to an aspect of the present invention, there is provided a magnesium alloy member, consisting of or comprising: an aluminum-containing magnesium alloy material, the magnesium alloy material having a modified layer formed at a surface thereof in such a manner that at least a surface of the modified layer has a higher aluminum content than that of any unmodified base portion of the magnesium alloy material.

The other objects and features of the invention will also become understood from the following description.

DESCRIPTION OF THE EMBODIMENTS

The present invention will be described below with reference to the drawings. In the following description, all percentages "%" are by mass unless otherwise specified.

Figure 1:
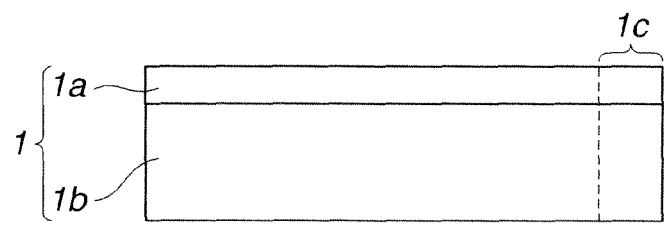
FIG. 1 is a schematic view of a magnesium alloy member according to one embodiment of the present invention.

As shown in FIG. 1, a magnesium alloy member according to one embodiment of the present invention has a main body made of an aluminum-containing magnesium alloy material 1, wherein the magnesium alloy material 1 has a modified layer 1a formed at a surface thereof in such a manner that at least a surface of the modified layer 1a has a higher aluminum content than that of any other unmodified (original) base portion 1b of the magnesium alloy material 1. It is herein noted that, although the modified layer 1a and the unmodified base portion 1b are illustrated as two separate layers in FIG. 1 for the sake of simplicity, there may or may not be a clear interface between the modified layer 1a and the unmodified base portion 1b.

The content of magnesium (Mg) in the surface of the modified layer 1a relatively decreases as the content of aluminum (Al) in the surface of the modified layer 1a increases. This leads to a reduction in the amount of magnesium oxide, which is known to have poor adhesion to an adhesive or coating material, in the surface of the modified layer 1a and facilitates the formation of a covalent bond or hydrogen bond between Al of the modified layer 1a and a functional group of the adhesive or coating material. It is therefore possible to increase the surface activity of the modified layer 1a and improve the adhesion (bonding/coating) properties of the magnesium alloy material 1.

There is no particular restriction on the form of the magnesium alloy material 1. The magnesium alloy material 1 can be formed into any shape by a known forming process such as mold casting, sand casting, die casting, extrusion, forging and press forming.

There is also no particular restriction on the Al content of the magnesium alloy material 1 as long as the magnesium alloy material 1 contains Al. It is preferable that the magnesium alloy material 1 has an initial Al content of 2% or more (i.e. the Al content of the unmodified base portion 1b is 2% or more) in order to ensure the formation of the active surface modified layer 1a.

Specific examples of the magnesium alloy material 1 are those classified as AZ31, AZ31B, AZ61, AZ91, AZ91D, AM50, AM60 and AM60B according to SAE (Society of Automotive Engineers) J465. Herein, the alphabetic characters "AZ" and "AM" refer to the kinds of metal elements added in the magnesium alloys where "A", "M" and "Z" represent aluminum (Al), manganese (Mg) and zinc (Zn), respectively. The numerals after the alphabetic characters indicate the amounts of the metal elements added. For example, AZ91 alloy means that the alloy contains 9% aluminum and 1% zinc. Among others, AZ31, AZ61, AZ91, AM60 and AM60B alloys can be typically preferably used.

As other examples of the magnesium alloy material 1, there can be used magnesium alloy plates available under the trade names of AS21X (magnesium alloy plate containing 2% aluminum and 1% silicon) and MRI153 (magnesium alloy plate containing 8% aluminum and 1% calcium).

The modified layer 1a is not necessarily formed on the whole of the surface of the magnesium alloy material 1 and may be formed on only a required area of the surface of the magnesium alloy material 1 e.g. to which an adhesive or coating material is to be applied.

In order to achieve particularly good adhesion (bonding/coating) properties, it is preferable that the Al content of the surface of the modified layer 1a is made 1.5 times or more higher than that of the unmodified base portion 1b.

There is no particular restriction on the process of formation of the modified layer 1a (i.e. the process of surface modification of the magnesium alloy material 1). For example, the modified layer 1a can be formed by surface treating the magnesium alloy material 1 with high-temperature steam. By such steam treatment, Mg element is eluted from the surface of the magnesium alloy material 1. This leads to disappearance of magnesium oxide from the surface of the magnesium alloy material 1 and migration and exposure of Al element from inside to the surface of the magnesium alloy material 1. As a result, the Al content of the surface and its vicinity of the magnesium alloy material 1 becomes relatively increased to define the modified layer 1a of higher Al content. The modified layer 1a can alternatively be formed by any other process such as aluminum plating or ion implantation.

It is preferable to form the modified layer 1a by immersion treatment of the magnesium alloy material 1 in an aqueous treatment solution containing at least one kind of inorganic chloride.

Preferred examples of the inorganic chloride contained in the aqueous treatment solution are metal chlorides such as lithium chloride, rubidium chloride, potassium chloride, barium chloride, strontium chloride, calcium chloride, sodium chloride and magnesium chloride. These chlorides can be used solely or in combination of two or more thereof.

The inorganic chloride, notably metal chloride, has the feature of simply ionizing to a chloride ion and a metal ion (cation) and shows high solubility in water. The hydroxy ion concentration of the aqueous treatment solution thus increases with the addition of the inorganic chloride. The immersion treatment of the magnesium alloy material 1 in such an aqueous chloride solution allows Mg element to be eluted preferentially from the surface of the magnesium alloy material 1 and thereby allows Al element to be migrated and exposed to the surface of the magnesium alloy material 1 so that the Al content of the surface and its vicinity of the magnesium alloy material 1 becomes relatively increased. This makes it possible to form the modified layer 1a efficiently with high reliability without causing deteriorations in the strength of the magnesium alloy material 1 and in the durability of the modified layer 1a. This is also effective in forming a double hydroxide at the surface of the modified layer 1a as will be explained later.

The chlorine concentration of the aqueous treatment solution is preferably in the range of 0.004 mol % to saturation concentration so as to prevent the inorganic chloride from being precipitated as an adhesion inhibition factor on the surface of the magnesium alloy material 1.

As one preferred example of the aqueous treatment solution, there can be used an aqueous lubricant (working fluid) that contains at least one kind of inorganic chloride and a surfactant. The aqueous lubricant is applicable to any machining process such as grinding with a grindstone or grinder, polishing with a sand paper, polishing cloth or polishing belt and cutting with a drill, milling cutter, saw or any other cutting tool.

The inorganic chloride is uniformly dispersed in the aqueous lubricant by the surfactant. The use of such an aqueous lubricant enables surface modification of the magnesium alloy material 1 by the uniformly dispersed inorganic chloride simultaneously with machining of the magnesium alloy material 1. This makes it possible to efficiently form the uniform and stable modified layer 1a and improve the adhesion (bonding/coating) properties of the magnesium alloy material 1 without causing deteriorations in the strength of the magnesium alloy material 1 and in the durability of the modified layer 1a. This also contributes to improvement in the stability of ground treatment such as chemical conversion treatment or primer coating treatment and reduction in the amount of mineral or synthetic oil residue after the machining.

There is no particular restriction on the inorganic chloride contained in the aqueous lubricant. Various kinds of inorganic chlorides such as ammonium chloride can be used. The inorganic chloride is preferably a metal chloride. Preferred examples of the metal chloride contained in the aqueous lubricant are those indicated above. These chlorides can be used solely or in combination of two or more thereof.

Further, the content of the inorganic chloride in the aqueous lubricant is preferably adjusted in such a manner that the chlorine concentration of the aqueous lubricant is in the range of 0.004 mol % to saturation concentration. When the chloride concentration of the aqueous lubricant is in the above range, the modified layer 1a can be formed uniformly and stably without the inorganic chloride being precipitated as an adhesion inhibition factor on the surface of the magnesium alloy material 1.

As the surfactant, there can be used anionic surfactants such as: fatty acid surfactants e.g. fatty acid sodium salts, fatty acid potassium salts and α-sulfofatty acid ester sodium salts; linear alkylbenzene surfactants e.g. sodium linear alkylbenzene sulfonates; higher alcohol surfactants e.g. sodium alkylsulfate esters and sodium alkyl ether sulfate esters; alpha-olefin surfactants e.g. sodium α-olefin sulfonates; and normal paraffin surfactants e.g. sodium alkylsulfonates. The content of the surfactant in the aqueous lubricant is preferably adjusted to about 0.1 to 1.6%.

Preferably, the surfactant contains an alcohol fraction in order to increase the compatibility of the inorganic chloride, water and mineral/synthetic oil in the aqueous lubricant and thereby form the modified layer 1a uniformly and stably.

Examples of the alcohol contained in the surfactant are those of monohydric, dihydric and trihydric alcohols each having a carbon number of 1 to 10, such as methanol, ethanol, isopropyl alcohol, ethylene glycol and glycerin. Two or more kinds of alcohols may be used in combination. The presence of such a kind of alcohol in the surfactant effectively improves the compatibility of the inorganic chloride, water and mineral/synthetic oil in the aqueous lubricant and the fluidity of the aqueous lubricant. As the inorganic chloride, water and mineral/synthetic oil are dispersed more uniformly in the aqueous lubricant, the modified layer 1a can be formed uniformly and stably without variations due to fluctuations in the inorganic chloride concentration and without inhibition by the mineral/synthetic oil. Further, the aqueous lubricant becomes less likely to remain on the surface of the magnesium alloy material 1. The amounts of the inorganic chloride and mineral/synthetic oil remaining as residues on the surface of the magnesium alloy material 1 after the machining can be reduced as the inorganic chloride and mineral/synthetic oil are vaporized together with the alcohol. The content of the alcohol in the aqueous lubricant is not particularly restricted and is preferably 3 to 50% by volume.

In the present invention, the formation of the modified layer 1a (i.e. the Al content of the surface of the magnesium alloy material 1) can be readily confirmed by e.g. X-ray photoelectron spectroscopy (XPS) and, more specifically, by determining the contents (atomic %) of the metal (e.g. Al) and oxygen atoms in the surface of the magnesium alloy material 1 and the bond energies between the metal and oxygen atoms in the surface of the magnesium alloy material 1 from XPS measurement results.

Preferably, the surface of the modified layer 1a contains a double hydroxide of Mg and Al. For example, the Mg—Al double hydroxide can be formed by the treatment of the magnesium alloy material 1 with the aqueous treatment solution (aqueous lubricant) as explained above. The Mg—Al double hydroxide can alternatively be formed as a precipitate by mixing a mixed aqueous solution of divalent and trivalent metal salts with an alkaline solution. Specific examples of the Mg—Al double hydroxide are those represented by $Mg_{8-x}Al_x(OH)_{16}CO_2.nH_2O$ where x is an integer of 2 to 5 and n is an integer of 0 or greater. In the above chemical formula, carbon (C) is derived from magnesium carbonate generated by reaction of Mg with carbon dioxide of the air.

The double hydroxide has the feature of readily forming a covalent bond or hydrogen bond with a functional group (such as acrylic group, epoxy group, isocyanate group or hydroxyl group) of the adhesive or coating material. Further, the double hydroxide has the function of significantly improving the adhesion and durability of the adhesive or coating material under the cohesive force of crystalline water or adsorbed water of the double hydroxide. The formation of such a double hydroxide contributes to improvement in the adhesion (bonding/coating) properties of the magnesium alloy material 1.

The formation of the double hydroxide at the surface of the modified layer 1a can be confirmed by e.g. Fourier transform infrared spectroscopy (FT-IR).

Figure 2:
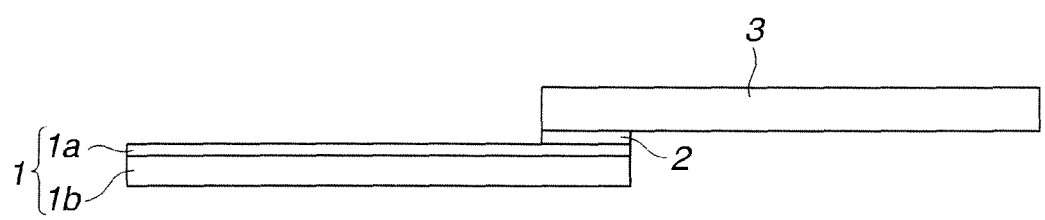
FIG. 2 is a schematic view of a magnesium alloy member according to a modification of the one embodiment of the present invention.

As shown in FIG. 2, the magnesium alloy member may further includes a layer of adhesive resin material 2 applied to the modified layer 1a of the magnesium alloy material 1 and an counterpart material 3 bonded by the adhesive resin material 2 to the modified layer 1a of the magnesium alloy material 1.

There is no particular restriction on the form of the counterpart material 3. The counterpart material 3 can be in the form of any structural component or article shaped to fit with the magnesium alloy material 1.

There is also no particular restriction on the kind of the counterpart material 3. Various kinds of materials can be used as the counterpart material 3.

Examples of the counterpart material 3 are: resin materials such as polyolefin resins e.g. polyethylene (PE) and polypropylene (PP), polystyrene (PS) resins, polyvinyl chloride (PVC) resins, polyester resins, polyamide (PA) resins, polyamideimide (PAI) resins, acrylonitrile-butadiene-styrene (ABS) resins, polycarbonate (PC) resins, polyacetal (POM) resins, acrylic resins, urea resins, melamine resins, epoxy resins, phenol (PF) resins and polyphenylene sulfide (PPS) resins; metal materials such as steels, aluminum alloys, magnesium alloys, copper alloys and titanium alloys; fabric materials of carbon fibers, aramid fibers, glass fibers, natural fibers etc.; rubber materials such as natural rubbers, styrene-butadiene rubbers (SBR), acrylonitrile-butadiene rubbers (NBR) and ethylene-propylene rubbers (EPDM); glass materials; and ceramic materials. Among others, preferred are resin materials and metal materials. It is conceivable to use the magnesium alloy material 1 as the counterpart material 3 and thereby produce the magnesium alloy member as a composite of the magnesium alloy materials 1. In this case, it is preferable that the modified layers 1a of the magnesium alloy materials 1 face each other via the adhesive resin material 2.

There is no particular restriction on the kind of the adhesive resin material 2 as long as the adhesive resin material 2 is capable of being applied to at least an required area e.g. an end area 1c (but typically the whole) of the surface of the modified layer 1a of the magnesium alloy body 1 and being cured after mating the surfaces of the magnesium alloy material 1 and the counterpart material 3 together. Various adhesive resins can be used as the adhesive resin material 2.

Examples of the adhesive resin material 2 are: (1) hot melt resins of polyolefin type (e.g. polyethylene (PE) type, ethylene-vinyl acetate (EVA) type etc.), synthetic rubber type (e.g. polybutadiene (SBS) type, polyisoprene (SIS) type etc.), polyamide type and polyester type; (2) epoxy resins; (3) urethane resins; (4) natural rubbers and synthetic rubbers such as styrene-butadiene rubber (SBR), acrylonitrile-butadiene rubber (NBR), ethylene-propylene rubber (EPDM), chloroprene rubber (CR), butyl rubber (IIR) and butadiene rubber (BR); (5) acrylic resins such as those called "Second Generation Acrylic Adhesives (SGA)"; (6) urea resins; (7) melamine resins; (8) phenol resins; and (9) silicone resins (including modified silicones).

There is also no particular restriction on the process of application of the adhesive resin material 2 to the modified layer 1a of the magnesium alloy material 1. The adhesive resin material 2 can be directly applied to the modified layer 1a of the magnesium alloy material 1 with a brush, may be immersed into a cloth and then applied from the cloth to the modified layer 1a of the magnesium alloy material 1, or may be applied to the modified layer 1a of the magnesium alloy material 1 with a painting machine such as a spray, a blade coater, an air knife coater, a roll coater, a bar coater, a gravure coater, a flow coater, a curtain coater or an application gun or by any other application process such as dipping.

In order to accelerate the curing of the adhesive resin material 2, heat treatment and/or humidification treatment can be performed as required after applying the adhesive resin material 2 to the magnesium alloy material 1 and mating the magnesium alloy material 1 and the counterpart material 3. It is particularly preferable, in the case of using the epoxy resin, urethane resin or silicone resin as the adhesive resin material 2, to accelerate the curing of the adhesive resin material 2 by treatment under the conditions of a temperature of 40 to 150° C. and an humidity of 30 to 100% RH (relative humidity).

Preferably, the adhesive resin material 2 is at least one selected from the group consisting of acrylic resins, urethane resins, epoxy resins and silicone resins in order to achieve good workability, quick curing properties as well as sufficient adhesion durability.

There is no particular restriction on the kind of the acrylic resin used. Various kinds of acrylic resins such as thermoplastic acrylic resins, thermosetting acrylic resins and moisture-curable acrylic resins can be used for the adhesive resin material 2.

Specific examples of the thermoplastic acrylic resins are polymers and copolymers of acrylic esters such as methyl methacrylate and ethyl acrylate or methacrylic esters, in each of which an alkyl group of the ester moiety can be methyl, ethyl, n-propyl, isopropyl, n-butyl, isobutyl, tert-butyl, n-hexyl, lauryl or stearyl. In the case of the methacrylic ester copolymer, two or more kinds of ester moieties may be used.

Specific examples of the thermosetting acrylic resins are copolymers of two or more kinds of monomers, one of which is selected from the group consisting of monomers having cross-linking functional groups (e.g. carboxyl, hydroxyl, amino, methylol, epoxy etc.), such as acrylic acid, methacrylic acid, acrylamide, methacrylamide, N-methylol acrylamide, allyl glycidyl ether and glycidyl methacrylate; and the other is selected from the group consisting of styrene, acrylic esters and methacrylic esters having no cross-linking functional groups.

Specific examples of the moisture-curable acrylic resins are methylcyanoacrylate, ethylcyanoacrylate, propylcyanoacrylate and butylcyanoacrylate.

Among the above acrylic resins, preferred are thermosetting acrylic resins and moisture-curable acrylic resins.

The acrylic resin may contain an additive(s) as required. Examples of the additive are: (1) antioxidants such as hindered amine, hydroquinone, hindered phenol and sulfur-containing compound; (2) UV absorbers such as benzophenone, benzotriazole, salicylate and metal complex salt; (3) weather resistance stabilizers such as metallic soap, organic and inorganic heavy metal salts and organic tin compound; (4) plasticizers such as phthalate ester, phosphoric ester and fatty ester; (5) waxes such as paraffin wax, polymer wax, beeswax, spermaceti wax, low-molecular-weight polyolefin; (6) organic and inorganic fillers such as calcium carbonate, kaoline, talc, mica, bentonite, clay, carbon black, glass balloon, acrylic resin powder, phenol resin powder, ceramic powder, zeolite and titanium oxide; (7) organic and inorganic fibers such as glass fiber, aramid fiber, carbon fiber, acrylic fiber, nylon fiber, polyester fiber, alumina fiber and boron fiber; (8) antistatic agents; (9) antimicrobial agents; (10) dehydrators; (11) flame retardants; (12) solvents; (13) pigments; (14) perfumes; (15) accelerators. These additives can be used solely or in combination of two or more thereof.

There is no particular restriction on the kind of the urethane resin used as long as the urethane resin contains a compound having two or more isocyanate groups in its molecule. Various kinds of urethane resins can be used for the adhesive resin material 2.

Specific examples of the compound with two or more isocyanate groups are: aromatic diisocyanates such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylidene diisocyanate (TMXDI), tolidine diisocyanate (TODI) and 1,5-naphthalene diisocyanate (NDI); aliphatic diisocyanates such as hexamethylene diisocyanate (HDI), trimethylhexamethylene diisocyanate (TMHDI), lysine diisocyanate and norbornane diisocyanate (NBDI); alicyclic diisocyanates such as transcyclohexane-1,4-diisocyanate, isophorone diisocyanate (IPDI), H6-XDI (hydrogenated XDI) and H12-MDI (hydrogenated MDI); carbodiimide-modified diisocyanates obtained by modifying the above diisocyanates with carbodiimide; isocyanurate-modified diisocyanates obtained by the above diisocyanates with isocyanurate. These compounds can be used solely or in combination of two or more thereof.

Among the above urethane resins, preferred are 4,4'-MDI, 2,4'-MDI, HDI, XDI and prepolymers thereof.

The urethane resin may additionally contain a polyol compound as required. The polyol compound is not particularly restricted as long as it has two or more hydroxyl groups in the molecule. Specific examples of the polyol compound are: polyetherpolyols such as polyethylene glycol (PEG), polypropylene glycol (PPG) and polytetramethylene ether glycol (PTMG) and polyesterpolyols of condensed type and lactone type. Among others, preferred are polyetherpolyols.

The urethane resin may also contain a catalyst as required. The catalyst is not particularly restricted as long as it is capable of controlling (increasing or decreasing) the curing rate of the urethane resin. Examples of the catalyst are: monoamines such as triethylamine (TEA) and N,N'-dimethylcyclohexylamine (DMEDA); diamines such as N,N,N',N'-tetramethylethylene diamine (TMEDA) and N,N,N',N'-tetramethylhexane-1,6-diamine (TMHMDA); triamines such as N,N,N',N'',N''-pentamethyldipropylene triamine (PMDPTA) and tetramethyl guanidine (TMG); cyclic amines such as triethylenediamine (TEDA), N,N'-dimethyl piperazine (DMP) and N-methyl morpholine (NMMO); and alcohol amines such as dimethylamino ethanol (DMEA) and N-methyl-N'-(2-hydroxyethyl)-piperazine (MHEP). Among others, preferred are triamines and cyclic amines.

The urethane resin may further contain an additive as required. Examples of the additive usable in the urethane resin are the same as those usable in the acrylic resin as mentioned above. Two or more kinds of additives can be used in combination.

There is no particular restriction on the kind of the epoxy resin used as long as the epoxy resin contains an epoxy compound having two or more epoxy groups and a curing agent. Various kinds of epoxy resins can be used for the adhesive resin material 2.

Specific examples of the epoxy compound are bisphenol A type epoxy resins, bisphenol F type epoxy resins, bisphenol AD type epoxy resins, phenol novolac type epoxy resins, cresol novolac type epoxy resins, biphenyl type epoxy resins, glycidyl ester type epoxy resins, alicyclic type epoxy resins and heterocyclic type epoxy resins. Among others, preferred are epoxy resins of bisphenol A type and bisphenol F type.

Specific examples of the curing agent are: aliphatic amines such as ethylenediamine (EDA), diethylenetriamine (DETA), triethylenetetramine (TETA), tetraethylenepentamine (TEPA), isophoronediamine (IPDA) and N-aminoethylpiperazine (N-AEP); aliphatic aromatic amines such as m-xylenediamine (MXDA); aromatic amines such as metaphenylene diamine (MPDA), diaminodiphenylmethane (DDM) and diaminodiphenylsulfone (DDS); other amines such as dicyandiamide (DICY) and adipic dihydrazide (AADH); modified polyamines such as epoxy compound-added polyamines, Michael-added polyamines and Mannich-added polyamines; polyamide amines; and acid anhydrides such as phthalic anhydride (PA), tetrahydrophthalic anhydride (THPA), hexahydrophthalic anhydride (HHPA), methyltetrahydrophthalic anhydride (MeTHPA), methylhexahydrophthalic anhydride (MeHHPA), methylnadic anhydride (MNA), dodecylsuccinic anhydride (DDSA), pyromellitic dianhydride (PMDA), benzophenonetetracarboxylic dianhydride (BTDA), ethylene glycol bis(anhydro-trimellitate) (TMEG), trimellitic anhydride (TMA) and polyazelaic polyanhydride (PAPA). Among others, preferred are aliphatic amines, other amines, modified polyamines and polyamide amines.

The epoxy resin may additionally contain a catalyst as required. The catalyst is not particularly restricted as long as it is capable of controlling (increasing or decreasing) the curing rate of the epoxy resin. Specific examples of the catalyst are tertiary amines such as 2-(dimethylaminomethyl)phenol (DMP-10), 2,4,6-tris(dimethylaminomethyl)phenol (DMP30), triethanolamines, tetramethylguanidine, pyridine, picoline, piperidine, pyrrolidine and 1,8-diazabiscyclo(5,4,0)undecen-1 (DBU). Among others, DMP-10 and DMP-30 are preferred.

The epoxy resin may further contain an additive as required. Examples of the additive usable in the epoxy resin are the same as those usable in the acrylic resin and in the urethane resin as mentioned above. Two or more kinds of additives may be used in combination.

There is also no particular restriction on the kind of the silicone resin used. Various kinds of silicone resins such as thermosetting silicone resins and moisture-curable silicone resins can be used.

Specific examples of the thermosetting silicone resins are compositions each containing a vinyl group-containing organopolysiloxane and a Si—H group-containing organohydroxypolysiloxane as main components and prepared by using a platinum complex as a catalyst.

Specific examples of the moisture-curable silicone resins are dealcoholization type silicone resins, deoximation type silicone resins, deacetate type silicone resins, deamidation type silicone resins and deacetone type silicone resins.

Among the above silicone resins, preferred are moisture-curable silicone resins.

The silicone resin may further contain an additive as required. Examples of the additive usable in the silicone resin are the same as those usable in the acrylic resin, in the urethane resin and in the epoxy resin as mentioned above. Two or more kinds of additives may be used in combination.

There is no particular restriction on the use of the adhesive resin material 2 as long as the adhesive resin material 2 is applied to the required area of the surface of the magnesium alloy material 1 and cured after mating the magnesium alloy material 1 and the counterpart material 3. In view of adhesion durability, it is preferable to prepare an adhesive resin solution by diluting the adhesive resin material 2 with a solvent, applying the adhesive resin solution to the modified layer 1a of the magnesium alloy material 1, remove the solvent by vaporization and drying, further apply the adhesive resin material 2 with e.g. an application gun, and then, curing or hardening the adhesive resin material 2 after mating the magnesium alloy material 1 and the counterpart material 3. The adhesive resin material 2 may also be applied to the mating surface of the counterpart material 3 as required before mating the magnesium alloy material 1 and the counterpart material 3.

As explained above, the Al content of the surface of the modified layer 1a becomes increased to reduce the content of difficult-to-adhere magnesium oxide and facilitate the formation of a covalent bond or hydrogen bond between Al of the modified layer 1a and the functional group (such as acrylic group, epoxy group, isocyanate group or hydroxyl group) of the adhesive resin material 2. It is therefore possible to secure good adhesion of the magnesium alloy material 1 to the counterpart material 3 via the adhesive resin material 2 for a long time. Especially when the double hydroxide is formed at the surface of the modified layer 1a, the adhesion of the magnesium alloy material 1 (modified layer 1a) to the counterpart material 3 via the adhesive resin material 2 can be further enhanced by the formation of a covalent bond or hydrogen bond between the double hydroxide and the functional group of the adhesive resin material 2 and by the cohesive force of crystalline water or adsorbed water of the double hydroxide. It is thus possible for the magnesium alloy material 1 (modified layer 1a) to secure particularly high adhesion durability as compared to those of conventional chemical conversion treatment and blasting treatment.

Figure 3:
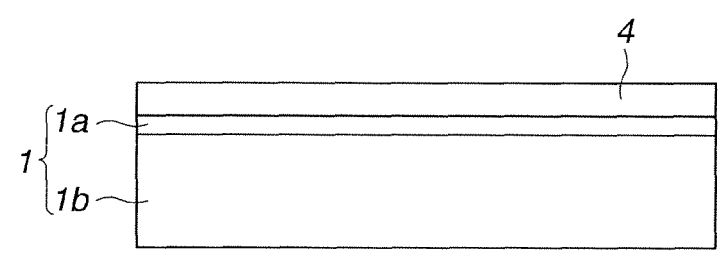
FIG. 3 is a schematic view of a magnesium alloy member according to another modification of the one embodiment of the present invention.

As shown in FIG. 3, the magnesium alloy member may alternatively have a coating 4 of ink or paint (hereinafter referred to as "coating material 4") applied by e.g. printing to the surface of the modified layer 1a of the magnesium alloy material 1. It is possible to achieve good adhesion of the magnesium alloy material 1 to the coating material 4 by the physical and chemical effects of the modified layer 1a based on the same principals as those of the case of adhesive bonding between the magnesium alloy material 1 (modified layer 1a) and the counterpart material 3 by the adhesive resin material 2 as shown in FIG. 2.

There is no particular restriction on the kind of the coating material 4 as long as the coating material 4 is capable of being applied to at least a required area (typically the whole) of the surface of the modified layer 1a of the magnesium alloy material 1 (typically, the whole surface of the modified layer 1a of the magnesium alloy material 1) so as to show the basic function of the ink or paint. Various kinds of ink and paint can be used. Examples of the ink are offset inks, printing inks, gravure inks and building inks. Examples of the paint are plastic paints, metal paints, ceramic paints, leather paints, conductive paints, insulating paints, UV curable paints and electron-beam curable paints.

There is also no particular restriction on the process of application of the coating material 4 to the modified layer 1a of the magnesium alloy material 1. The coating material 4 can be applied to the modified layer 1a of the magnesium alloy material 1 in the same manner as the adhesive resin material 2.

The present invention will be described in more detail below with reference to the following examples. These examples are, however, merely illustrative and are not intended to limit the present invention thereto.

Example 1

Sample Production

Potassium chloride was dispensed and dissolved in water by a stirrer, thereby preparing an aqueous treatment solution with a potassium chloride content of 3%. A plate of magnesium alloy AS21X (having an Al content of 2%, a Si content of 1% and a size of 25×50×3 mm) was kept immersed in the prepared aqueous treatment solution for 1 minute. After that, the treated surface of the magnesium alloy plate was washed with water and dried in a heated oven at 200° C. for 2 hours. The resulting magnesium alloy plate was used as a test sample of the magnesium alloy material 1. In this example, the immersion treatment time was set relatively short to reduce the amount of Al exposed at the surface of the modified layer 1a; and the heating/drying process was conducted after the immersion treatment process to evaporate water of crystallization and thereby remove a double hydroxide from the surface of the modified layer 1a.

(Evaluation Tests)

The test sample of the magnesium alloy material 1 was evaluated for the surface condition (i.e. the ratio of the Al content of the surface of the modified layer 1a to the Al content of the unmodified base portion 1b and the presence or absence of a double hydroxide at the surface of the modified layer 1a), initial adhesion and durable adhesion. The procedures of the evaluation tests were as follows.

Surface Condition

The treated surface of the magnesium alloy plate was analyzed using an X-ray photoelectron spectroscope "JPS-920" (available from JEOL Ltd.) to measure the bond energies (bond states) of the respective metal atoms in the treated surface of the magnesium alloy plate. The Al content (mol %) of the treated surface of the magnesium alloy plate was determined from the analytical measurement results as the Al content of the surface of the modified layer 1a. On the other hand, a magnesium alloy plate AS21X without immersion treatment was polished in one direction for 1 minute with a sand paper No. 320 and subjected to air blowing for 5 to 10 minutes to remove foreign matters from its surface. The untreated polished surface of the magnesium alloy plate was analyzed in the same manner using the same X-ray photoelectron spectroscope as above. The Al content (mol %) of the untreated polished surface of the magnesium alloy plate was determined from the analytical measurement results as the Al content of the unmodified base portion 1b. The Al content ratio was then calculated by dividing the Al content of the modified layer 1a by the Al content of the unmodified base portion 1b.

The treated surface of the magnesium alloy plate was also analyzed by Fourier transform infrared spectroscopy (FT-IR) to measure the IR absorption peaks of the compounds in the treated surface of the magnesium alloy plate as well as the bond states of the respective metal atoms in the treated surface of the magnesium alloy plate. The presence or absence of a double hydroxide at the surface of the modified layer 1a was judged based on these analytical measurement results.

Initial Adhesion

An adhesion test sample was produced as follows. A silicone adhesive "TB1217H" (available from ThreeBond Co., Ltd.) and an aluminum alloy plate "ADC12" (having a size of 25×125×3 mm) were prepared in addition to the treated magnesium alloy plate. The adhesive was applied to an end area of 10 mm in width of the treated surface of the magnesium alloy plate, followed by bonding an end area of the surface of the aluminum alloy plate to the end area of the treated surface of the magnesium alloy plate by the adhesive. The resulting plate assembly was left for 168 hours at room temperature. Herein, the application amount of the adhesive was adjusted in such a manner that the thickness of the adhesive after the curing was 2 mm.

The adhesion test sample was subjected to tensile shear test using an autograph ("AG-I 20kN" available from Shimadzu Corporation) to measure the shear strength of the test sample.

After the tensile shear test, the rate of a surface area of the adhesion test sample in which cohesive failure of the adhesive occurred to the total surface area of the adhesive applied was determined by visual inspection as the cohesive failure rate of the test sample.

Durable Adhesion

The same adhesion test sample as above was prepared, left in an engine oil 5W-30 (SM Strong Save X) at a controlled temperature of 50° C. for 168 hours and further left at room temperature for 24 hours. After that, the test sample was evaluated for the shear strength and cohesive failure rate in the same manner as above.

It is herein noted that the cohesive failure is a structural fracture of the adhesive. In general, there occurs an interfacial failure (i.e. a separation at the interface between the magnesium alloy plate and the adhesive), rather than a cohesive failure, in the sample when the adhesion strength between the magnesium alloy plate and the adhesive is low. Further, the sample shows a high cohesive failure rate but a low shear strength if the cohesive failure occurs in the sample due to incomplete cure of the adhesive. It can be thus said that: the higher the adhesion strength between the magnesium alloy plate and the adhesive, the higher the shear strength and cohesive failure rate: and, the smaller the difference between the initial adhesion and the durable adhesion, the higher the adhesion durability.

The evaluation test results of Example 1 are indicated in TABLE 1.

Example 2

A test sample of the magnesium alloy material 1 was produced in the same manner as in Example 1, except that the immersion treatment time was set to 5 minutes to allow a greater amount of Al to be exposed at the surface of the modified layer 1a, and evaluated in the same manner as in Example 1. The evaluation results are indicated in TABLE 1.

Example 3

A test sample of the magnesium alloy material 1 was produced in the same manner as in Example 2, except that no heating/drying process was performed after the immersion treatment process to allow a double hydroxide to remain in the surface of the modified layer 1a, and evaluated in the same manner as in Examples 1 and 2. The evaluation results are indicated in TABLE 1.

Example 4

A test sample of the magnesium alloy material 1 was produced in the same manner as in Example 3, except for using a plate of magnesium alloy "AZ31" (having an Al content of 3% and a Zn content of 1%) in place of the magnesium alloy plate "AS21X", and evaluated in the same manner as in Examples 1 to 3. The evaluation results are indicated in TABLE 1.

Example 5

A test sample of the magnesium alloy material 1 was produced in the same manner as in Example 3, except for using a plate of magnesium alloy "AZ91" (having an Al content of 9% and a Zn content of 1%) in place of the magnesium alloy plate "AS21X", and evaluated in the same manner as in Examples 1 to 4. The evaluation results are indicated in TABLE 1.

Example 6

A test sample of the magnesium alloy material 1 was produced in the same manner as in Example 3, except for using a plate of magnesium alloy "MRI153" (having an Al content of 8% and a Ca content of 1%) in place of the magnesium alloy plate "AS21X", and evaluated in the same manner as in Examples 1 to 5. The evaluation results are indicated in TABLE 1.

Comparative Example 1

The same magnesium alloy plate "AS21X" as used in Examples 1 to 3 was prepared as a substrate. A surface of the magnesium alloy plate was polished in one direction for 1 minute with a sand paper No. 320 and subjected to air blowing for 5 to 10 minutes. No surface modification (immersion treatment) was performed on the magnesium alloy plate. The resulting untreated magnesium alloy plate was used as a comparative sample of magnesium alloy material. The comparative sample was evaluated in the same manner as in Examples 1 to 6. The evaluation results are indicated in TABLE 1.

Comparative Example 2

A comparative sample of magnesium alloy material was produced in the same manner as in Comparative Example 1, except for using a plate of magnesium alloy "AZ31" (having an Al content of 3% and a Zn content of 1%) in place of the magnesium alloy plate "AS21X", and evaluated in the same manner as in Examples 1 to 6. The evaluation results are indicated in TABLE 1.

Comparative Example 3

A comparative test sample of magnesium alloy material was produced in the same manner as in Comparative Example 1, except for using a plate of magnesium alloy "AZ91" (having an Al content of 9% and a Zn content of 1%) in place of the magnesium alloy plate "AS21X", and evaluated in the same manner as in Examples 1 to 6. The evaluation results are indicated in TABLE 1.

Comparative Example 4

A comparative test sample of magnesium alloy material was produced in the same manner as in Comparative Example 1, except for using a plate of magnesium alloy "MRI153" (having an Al content of 8% and a Ca content of 1%) in place of the magnesium alloy plate "AS21X", and evaluated in the same manner as in Examples 1 to 6. The evaluation results are indicated in TABLE 1.

Comparative Example 5

A comparative test sample of magnesium material was produced in the same manner as in Comparative Example 1, except for using a plate of pure magnesium in place of the magnesium alloy plate "AS21X", and evaluated in the same manner as in Examples 1 to 6. The evaluation results are indicated in TABLE 1.

TABLE 1

| | Magnesium alloy material | | Modified layer | |
| --- | --- | --- | --- | --- |
| | Kind | Al content (%) | Al content ratio* | Double hydroxide |
| Example 1 | AS21X | 2 | 1.30 | Not formed |
| Example 2 | AS21X | 2 | 1.50 | Not formed |
| Example 3 | AS21X | 2 | 1.50 | Formed |
| Example 4 | AZ31 | 3 | 1.55 | Formed |
| Example 5 | AZ91 | 9 | 1.67 | Formed |
| Example 6 | MRI153 | 11 | 1.64 | Formed |
| Comparative Example 1 | AS21X | 2 | 1 | Formed |
| Comparative Example 2 | AZ31 | 3 | 1 | Not formed |
| Comparative Example 3 | AZ91 | 9 | 1 | Not formed |
| Comparative Example 4 | MRI153 | 11 | 1 | Not formed |
| Comparative Example 5 | Pure Mg | 0 | — | Not formed |

| | Initial adhesion | | Durable adhesion | |
| --- | --- | --- | --- | --- |
| | Shear strength (MPa) | Cohesive failure rate (%) | Shear strength (MPa) | Cohesive failure rate (%) |
| Example 1 | 1.30 | 65 | 1.20 | 50 |
| Example 2 | 1.40 | 70 | 1.25 | 60 |
| Example 3 | 1.80 | 80 | 1.30 | 100 |
| Example 4 | 1.90 | 80 | 1.35 | 100 |
| Example 5 | 1.85 | 85 | 1.30 | 100 |
| Example 6 | 1.90 | 80 | 1.25 | 100 |
| Comparative Example 1 | 0.02 | 0 | 0.02 | 0 |
| Comparative Example 2 | 0.20 | 0 | 0.02 | 0 |
| Comparative Example 3 | 0.50 | 0 | 0.02 | 0 |
| Comparative Example 4 | 0.60 | 0 | 0.02 | 0 |
| Comparative Example 5 | 0.02 | 0 | 0.02 | 0 |

*Al content ratio: aluminum content of surface of modified layer divided by aluminum content of unmodified base portion As shown in TABLE 1, each of the test samples of Examples 1 to 6 in which the Al content of the surface of the modified layer 1a was higher than that of the unmodified base portion 1b had excellent adhesion properties such as good initial adhesion and high adhesion durability. In particular, the test samples of Examples 3 to 6 in which the double hydroxide was formed at the surface of the modified layer 1a had more excellent adhesion properties (better initial adhesion and higher adhesion durability).

On the other hand, no modified layer was formed in each of the samples of Comparative Examples 1 to 5. Even if Al was contained in the surface of the sample, the Al content of aluminum in the surface of the sample was not higher than that of the other remaining portion of the sample in Comparative Examples 1 to 5. The samples of Comparative Examples 1 to 5 had poor adhesion properties.

It has been shown by the above evaluation results that it is possible to improve the adhesion of the magnesium alloy material 1 by forming the modified layer 1a at the surface of the magnesium alloy material 1 in such a manner that at least the surface of the modified layer 1a has a higher Al content than that of the unmodified base portion 1b.

Example 7

Sample Production

An aqueous cutting oil "NEOCOOL Bio-60" (available from Matsumura Oil Research Corp.) was diluted by 30 times with water and mixed with calcium chloride (available from Kanto Chemical Co., Inc.) by a stirrer, thereby preparing an aqueous lubricant with a calcium chloride content of 3%. It is herein assumed that, as the cutting oil "NEOCOOL Bio-60" has a composition of 30 to 40% of a base oil and 30% or more of a fatty acid surfactant and was diluted by 30 times with water, the surfactant content of the prepared aqueous lubricant was about 1%. On the other hand, a plate of magnesium alloy "AZ31" (having a size of 25×50×3 mm) was provided. A surface of the magnesium alloy plate was repeatedly polished in one direction for 1 minute with a sand paper No. 320 while applying the aqueous lubricant to the surface of the magnesium alloy plate. The magnesium alloy plate was then left for 5 to 10 minutes. After that, the surface of the magnesium alloy plate was washed with water. The resulting machined magnesium alloy plate was used as a test sample of the magnesium alloy material 1.

(Evaluation Tests)

The test sample of the magnesium alloy material 1 was evaluated for the surface condition (i.e. the presence or absence of a double hydroxide at the surface of the modified layer 1a and the cleanliness of the surface of the modified layer 1a), initial adhesion and durable adhesion. The procedures of the evaluation tests were as follows.

Surface Condition

The machined magnesium alloy plate was left cooled to room temperature and analyzed by Fourier transform infrared spectroscopy (FT-IR) to measure the IR absorption peaks of the compounds in the machined surface of the magnesium alloy plate as well as the bond states of the respective metal atoms in the machined surface of the magnesium alloy plate. The presence or absence of a double hydroxide at the surface of the modified layer 1a was judged based on these analytical measurement results.

Further, the machined surface of the magnesium alloy plate was wiped with a filter paper of known weight. The increase in weight of the filter paper before and after the wiping was divided by an area of the wiped surface of the magnesium alloy plate. The cleanliness of the machined surface of the magnesium alloy plate was rated by the division result as follows.

Very good: 0 to 0.09 $g/m^2$
Good: 0.1 to 0.19 $g/m^2$
Not good: 0.2 to 0.29 $g/m^2$
Bad: 0.3 $g/m^2$ or more Initial Adhesion and Durable adhesion An adhesion test sample was produced using the machined magnesium alloy plate and evaluated for the initial adhesion and adhesion durability in the same manner as in Examples 1 to 6.

The evaluation test results of Example 7 are indicated in TABLE 2.

Example 8

An aqueous lubricant was prepared in the same manner as in Example 7, except for using sodium chloride (available from Kanto Chemical Co., Inc.) in place of calcium chloride. A test sample of the magnesium alloy material 1 was produced in the same manner as in Example 7 using the prepared aqueous lubricant, and then, was evaluated in the same manner as in Example 7. The evaluation results are indicated in TABLE 2.

Example 9

A cutting oil "NEOCOOL Bio-60" was diluted by 30 times with water and mixed by a stirrer with calcium chloride (available from Kanto Chemical Co., Inc.) and with ethanol (available from Kanto Chemical Co., Inc.), thereby preparing an aqueous lubricant with a calcium chloride of 3% and an ethanol content of 30 vol %. A test sample of the magnesium alloy material 1 was produced in the same manner as in Example 7 using the prepared aqueous lubricant, and then, was evaluated in the same manner as in Examples 7 and 8. The evaluation results are indicated in TABLE 2.

Example 10

An aqueous lubricant was prepared in the same manner as in Example 9, except for using sodium chloride and isopropyl alcohol in place of calcium chloride and ethanol, respectively. A test sample of the magnesium alloy material 1 was produced in the same manner as in Example 7 using the prepared aqueous lubricant, and then, was evaluated in the same manner as in Examples 7 to 9. The evaluation results are indicated in TABLE 2.

Example 11

An aqueous lubricant was prepared in the same manner as in Example 9, except for using potassium chloride and ethylene glycol in place of calcium chloride and ethanol, respectively. A test sample of the magnesium alloy material 1 was produced in the same manner as in Example 7 using the prepared aqueous lubricant, and then, was evaluated in the same manner as in Examples 7 to 10. The evaluation results are indicated in TABLE 2.

Example 12

An aqueous lubricant was prepared in the same manner as in Example 9, except for using glycerin in place of ethanol. A test sample of the magnesium alloy material 1 was produced in the same manner as in Example 7 using the prepared aqueous lubricant, and then, was evaluated in the same manner as in Examples 7 to 11. The evaluation results are indicated in TABLE 2.

Comparative Example 6

A PAO (poly-alpha-olefin) synthetic oil "SUPER MULPUS DX46" (available from Nippon Oil Corporation) was diluted by 30 times with water and mixed by a stirrer with sodium chloride, thereby preparing an aqueous lubricant with a sodium chloride content of 3%. A test sample of magnesium alloy material was produced in the same manner as in Example 7 using the prepared aqueous lubricant, and then, was evaluated in the same manner as in Examples 7 to 12. The evaluation results are indicated in TABLE 2.

Comparative Example 7

An aqueous lubricant was prepared in the same manner as in Comparative Example 6, except for using potassium chloride in place of sodium chloride. A test sample of magnesium alloy member was produced in the same manner as in Example 7 using the prepared aqueous lubricant, and then, was evaluated in the same manner as in Examples 7 to 12. The evaluation results are indicated in TABLE 2.

Comparative Example 8

A PAO synthetic oil "SUPER MULPUS DX46" was diluted by 30 times with water and mixed with ethanol by a stirrer, thereby preparing an aqueous lubricant with an ethanol content of 30 vol %. A test sample of magnesium alloy material was produced in the same manner as in Example 7 using the prepared aqueous lubricant, and then, was evaluated in the same manner as in Examples 7 to 12. The evaluation results are indicated in TABLE 2.

Comparative Example 9

An aqueous lubricant was prepared in the same manner as in Comparative Example 8, except for using isopropyl alcohol in place of ethanol. A test sample of magnesium alloy material was produced in the same manner as in Example 7 using the prepared aqueous lubricant, and then, was evaluated in the same manner as in Examples 7 to 12. The evaluation results are indicated in TABLE 2.

Comparative Example 10

An aqueous cutting oil "NEOCOOL Bio-60" was diluted by 30 times with water and stirred by a stirrer. This diluted cutting oil was used as an aqueous lubricant. A test sample of magnesium alloy material was produced in the same manner as in Example 7 using the above aqueous lubricant, and then, was evaluated in the same manner as in Examples 7 to 12. The evaluation results are indicated in TABLE 2.

Comparative Example 11

An aqueous cutting oil "NEOCOOL Bio-60" was diluted by 30 times with water and mixed with ethanol by a stirrer, thereby preparing an aqueous lubricant with an ethanol content of 30 vol %. A test sample of magnesium alloy material was produced in the same manner as in Example 7 using the prepared aqueous lubricant, and then, evaluated in the same manner as in Examples 7 to 12. The evaluation results are indicated in TABLE 2.

Comparative Example 12

An aqueous cutting oil "NEOCOOL Bio-60" was diluted by 30 times with water and mixed by a stirrer with trichloroethylene (as an organic chloride available from Kanto Chemical Co., Inc.), thereby preparing an aqueous lubricant with a trichloroethylene content of 3%. A test sample of magnesium alloy material was produced in the same manner as in Example 7 using the prepared aqueous lubricant, and then, was evaluated in the same manner as in Examples 7 to 12. The evaluation results are indicated in TABLE 2.

Comparative Example 13

An aqueous lubricant was prepared in the same manner as in Comparative Example 12, except for using tetrachloroethylene (as an organic chloride available from Kanto Chemical Co., Inc.) in place of trichloroethylene. A test sample of magnesium alloy material was produced in the same manner as in Example 7 using the prepared aqueous lubricant, and then, was evaluated in the same manner as in Examples 7 to 12. The evaluation results are indicated in TABLE 2.

Comparative Example 14

A test sample of magnesium alloy material was produced in the same manner as in Example 7, except that the polishing process was conducted with the use of no lubricant, and then, evaluated in the same manner as in Examples 7 to 12. The evaluation results are indicated in TABLE 2.

TABLE 2

| | Aqueous lubricant | | | | |
| --- | --- | --- | --- | --- | --- |
| | Inorganic chloride | | Surfactant | Alcohol | |
| | Kind | Content (%) | content (%) | Kind * | Content (vol %) |
| Example 7 | $CaCl_2$ | 3 | 1 | None | — |
| Example 8 | NaCl | 3 | 1 | None | — |
| Example 9 | $CaCl_2$ | 3 | 1 | EtOH | 30 |
| Example 10 | NaCl | 3 | 1 | IPA | 30 |
| Example 11 | KCl | 3 | 1 | EG | 30 |
| Example 12 | $CaCl_2$ | 3 | 1 | GLY | 30 |
| Comparative Example 6 | NaCl | 3 | — | None | — |
| Comparative Example 7 | KCl | 3 | — | None | — |
| Comparative Example 8 | None | — | — | EtOH | 30 |
| Comparative Example 9 | None | — | — | IPA | 30 |
| Comparative Example 10 | None | — | 1 | None | — |
| Comparative Example 11 | None | — | 1 | EtOH | 30 |
| Comparative Example 12 | ClHC=$CCl_2$ | 3 | 1 | None | — |
| Comparative Example 13 | $Cl_2$C=$CCl_2$ | 3 | 1 | None | — |
| Comparative Example 14 | None | — | — | None | — |

| | Surface condition | | Initial adhesion | | Durable adhesion | |
| --- | --- | --- | --- | --- | --- | --- |
| | Double hydroxide | Surface cleanliness | Shear strength (MPa) | Cohesive failure rate (%) | Shear strength (MPa) | Cohesive failure rate (%) |
| Example 7 | Formed | Good | 1.5 | 65 | 0.9 | 75 |
| Example 8 | Formed | Good | 1.4 | 65 | 0.9 | 70 |
| Example 9 | Formed | Very good | 1.8 | 80 | 1.2 | 80 |
| Example 10 | Formed | Very good | 1.7 | 80 | 1.1 | 80 |
| Example 11 | Formed | Very good | 1.8 | 85 | 1.3 | 90 |
| Example 12 | Formed | Very good | 1.9 | 80 | 1.1 | 90 |
| Comparative Example 6 | Not formed | Bad | 1.2 | 40 | 0.2 | 0 |
| Comparative Example 7 | Not formed | Bad | 1.1 | 35 | 0.1 | 0 |
| Comparative | Not formed | Good | 0.5 | 10 | 0.1 | 0 |

TABLE 2-continued

| | | | | | | | |
|---|---|---|---|---|---|---|---|
| Example 8 | | | | | | | |
| Comparative Example 9 | Not formed | Good | 0.4 | 10 | 0.1 | 0 | |
| Comparative Example 10 | Not formed | Not good | 0.3 | 15 | 0.1 | 0 | |
| Comparative Example 11 | Not formed | Good | 0.5 | 15 | 0.1 | 0 | |
| Comparative Example 12 | Not formed | Bad | 1.1 | 30 | 0.2 | 0 | |
| Comparative Example 13 | Not formed | Bad | 1.0 | 40 | 0.1 | 0 | |
| Comparative Example 14 | Not formed | Bad | 0.1 | 0 | 0.1 | 0 | |

* EtOH: ethanol, IPA: isopropyl alcohol, EG: ethylene glycol, GLY: glycerin

As shown in TABLE 2, the formation of the double hydroxide at the surface of the modified layer 1a was confirmed in each of the test samples of Examples 7 to 12. Further, there was less residue of mineral or synthetic base oil remaining on the surface of the test sample; and the surface of the test sample was generally clean in Examples 7 to 12. All of the test samples of Examples 7 to 12 had excellent adhesion properties such as good initial adhesion and high adhesion durability.

On the other hand, no double-hydroxide-containing modified layer was formed in each of the samples of Comparative Examples 6 to 14. The residue of mineral or synthetic base oil on the surface of the sample was confirmed in each of Comparative Examples 6 to 14. The samples of Comparative Examples 6 to 14 had poor adhesion properties.

It has been shown by the above evaluation results that it is possible to form the surface modified layer 1a containing the double hydroxide, without the mineral or synthetic oil residue remaining on the surface of the modified layer 1a, and thereby possible to further improve the adhesion properties of the magnesium alloy material 1 by machining the magnesium alloy material 1 with the use of the aqueous lubricant containing at least one kind of inorganic chloride and surfactant.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A method of producing a magnesium alloy member, comprising:
preparing an aqueous lubricant comprising
a base oil selected from the group consisting of mineral oil and synthetic oil,
water,
a fatty acid surfactant,
an inorganic chloride, and
at least one selected from the group consisting of monohydric, dihydric, and trihydric alcohols each having a carbon number of 1 to 10;
surface treating an aluminum-containing magnesium alloy material with the aqueous lubricant, thereby forming a modified layer at a surface of the magnesium alloy material in such a manner that at least a surface of the modified layer has a higher aluminum content than that of any unmodified base portion of the magnesium alloy material;
applying an adhesive resin material to at least part of the surface of the modified layer; and
bonding a counterpart material via the adhesive resin material to the surface of the modified layer.

2. The method of producing the magnesium alloy member according to claim 1, wherein the aluminum content of the unmodified base portion is 2 mass % or higher.

3. The method of producing the magnesium alloy member according to claim 1, wherein the aluminum content of the surface of the modified layer is 1.5 times or more higher than that of the unmodified base portion.

4. The method of producing the magnesium alloy member according to claim 1, wherein the surface of the modified layer contains a magnesium-aluminum double hydroxide.

5. The method of producing the magnesium alloy member according to claim 1, wherein the adhesive resin material is at least one selected from the group consisting of acrylic resins, urethane resins, epoxy resins and silicone resins.

6. The method of producing the magnesium alloy member according to claim 1, wherein the inorganic chloride is a metal chloride.

7. The method according to claim 6, wherein the metal chloride is at least one selected from the group consisting of lithium chloride, rubidium chloride, potassium chloride, barium chloride, strontium chloride, calcium chloride, sodium chloride and magnesium chloride.

* * * * *